(12) United States Patent
Eletrabi

(10) Patent No.: US 10,676,006 B2
(45) Date of Patent: *Jun. 9, 2020

(54) DUAL FUNCTIONAL ROBOT AND STORAGE BIN

(71) Applicant: TENNIBOT INC., Auburn, AL (US)

(72) Inventor: Haitham Eletrabi, Auburn, AL (US)

(73) Assignee: TENNIBOT, INC., Auburn, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,761

(22) Filed: Jun. 6, 2018

(65) Prior Publication Data

US 2018/0312095 A1    Nov. 1, 2018

Related U.S. Application Data

(63) Continuation of application No. 14/985,020, filed on Dec. 30, 2015, now Pat. No. 10,011,208.

(60) Provisional application No. 62/120,855, filed on Feb. 25, 2015, provisional application No. 62/210,461, filed on Aug. 27, 2015.

(51) Int. Cl.
| | |
|---|---|
| *B60P 1/00* | (2006.01) |
| *A63B 47/02* | (2006.01) |
| *A63B 47/00* | (2006.01) |
| *B60P 3/00* | (2006.01) |
| *G05D 1/08* | (2006.01) |
| *A63B 102/02* | (2015.01) |

(52) U.S. Cl.
CPC ............... *B60P 1/00* (2013.01); *A63B 47/00* (2013.01); *A63B 47/021* (2013.01); *B60P 3/00* (2013.01); *G05D 1/0891* (2013.01); *A63B 2047/022* (2013.01); *A63B 2102/02* (2015.10); *A63B 2210/00* (2013.01); *A63B 2220/802* (2013.01); *A63B 2220/806* (2013.01); *A63B 2225/54* (2013.01); *Y10S 901/01* (2013.01)

(58) Field of Classification Search
CPC ......................... A63B 2047/022; A63B 47/021
USPC ......................................................... 414/468
See application file for complete search history.

(56) References Cited

U.S. PATENT DOCUMENTS

| | | | |
|---|---|---|---|
| 2,810,487 | A | 10/1957 | Bailey |
| 3,102,647 | A | 9/1963 | Bonney |

(Continued)

FOREIGN PATENT DOCUMENTS

| | | |
|---|---|---|
| CN | 2858005 | 1/2007 |
| JP | 05192422 | 8/1993 |
| JP | 08107953 | 4/1996 |

OTHER PUBLICATIONS

Young, Lee W. "International Search Report and Written Opinion—PCT/US16/19159" ISA/US; dated Jul. 21, 2016; pp. 1-11.

(Continued)

*Primary Examiner* — Jonathan Snelting
(74) *Attorney, Agent, or Firm* — Nicholas J. Landau; Bradley Arant Boult Cummings LLP

(57) ABSTRACT

A dual functional robot for collecting rollable objects capable of an upright position and a horizontal position, in which the robot includes a way to propel the robot; a way to control propulsion of the robot; a way to locate the rollable object; a way to collect the rollable object; a way to store the rollable object; a way to support the robot and allow the robot to move across a surface in a low-friction manner; and a way to stably reorient the robot from the horizontal position into the upright position.

20 Claims, 6 Drawing Sheets

(56) References Cited

U.S. PATENT DOCUMENTS

| | | | |
|---|---|---|---|
| 3,485,398 | A | 12/1969 | Maximillian |
| 4,077,533 | A | 3/1978 | Meyer |
| 4,221,524 | A | 9/1980 | Morris |
| 4,221,542 | A | 9/1980 | Acres |
| 4,252,490 | A | 2/1981 | Keller |
| 4,735,544 | A | 4/1988 | Stotts |
| 4,844,527 | A | 7/1989 | Ray |
| 5,301,991 | A | 4/1994 | Chen |
| 6,079,930 | A | 6/2000 | Valdes-Rodriguez |
| 6,354,643 | B1 | 3/2002 | Podejko |
| 6,422,621 | B1 | 7/2002 | Tandlich |
| 7,377,565 | B1 | 5/2008 | Beavin |
| 8,262,517 | B2 | 9/2012 | Balasubramanyan |
| 8,297,669 | B2 | 10/2012 | Matthews |
| 8,313,396 | B1 | 11/2012 | Mailman |
| 8,534,726 | B2 | 9/2013 | Bulatao |
| 8,556,565 | B2 | 10/2013 | Reyes |
| 8,602,711 | B1 | 12/2013 | Nash |
| 8,920,101 | B2 | 12/2014 | Leyco |
| 9,114,285 | B2 | 8/2015 | Guo |
| 10,011,208 | B2 * | 7/2018 | Eletrabi .............. B60P 1/00 |
| 2004/0042884 | A1 | 3/2004 | Jester et al. |
| 2006/0068948 | A1 | 3/2006 | Mendoza |
| 2007/0017948 | A1 | 1/2007 | Smithson |
| 2009/0137348 | A1 | 3/2009 | Tsai |
| 2010/0250024 | A1 | 9/2010 | Macedo Ribeiro |
| 2012/0093621 | A1 | 4/2012 | Reyes |
| 2013/0210556 | A1 | 8/2013 | Villar et al. |
| 2014/0152507 | A1 | 6/2014 | McAllister |
| 2014/0294547 | A1 | 10/2014 | Guo |

OTHER PUBLICATIONS https://www.youtube.com/watch?v=z I Hp_GX2uOC "MiP Self Balancing Robot Friend by WowWee. Hands-On Review" (Toy, Gadget and Product Reviews by Dad Does) Apr. 15, 2014, entire document.
http://www.decathlon.co.uk/ball-collector-blue-id_8013707.html; DECATHLON web page [accessed Apr. 8, 2016] pp. 1-2.
http://tourna.co.uk/index.php/product/21-ball-tenntube-yellow-tennis-ball-collector; TOURNA web page [accessed Apr. 8, 2016] pp. 1-8.
http://www.playmatetennis.com/mower.asp; PLAYMATE web page [accessed Apr. 8, 2016]; pp. 1-3.
"ATBAC | Autonomous Tennis Ball Collector" (video) https://www.youtube.com/watch?v=3sPjfJfFKa4; screen shot from web page accessed Apr. 8, 2016.
UNM ME Senior Design Group 3 Ballbot Spring 2008 ("the Playmate") (video) https://www.youtube.com/watch?v=lSiakQxsgwY; screen shot from web page accessed Apr. 8, 2016.
"Tennis Ball Collector Robot" (video) https://www.youtube.com/watch?v=rJfwDakpbOQ; screen shot from web page accessed Apr. 8, 2016.
"Tennis Ball Picking Robot" (video) https://www.youtube.com/watch?v=EEbdo2WdTOl; screen shot from web page accessed Apr. 8, 2016.
"Tennis Ball Collecting Robot Video" (video) https://www.youtube.com/watch?v=hCtiyj099M4; screen shot from web page accessed Apr. 8, 2016.
"Tennis Ball Bot" (video) https://www.youtube.com/watch?v=bpA3v9Cs55c; screen shot from web page accessed Apr. 8, 2016.
"Tennis Ball Collection Robot" (video) https://www.youtube.com/watch?v=Q5GRffHEhF4; screen shot from web page accessed Apr. 8, 2016.
Chawla, N., et al. "Robotic Tennis Ball Collector," 2012 Florida Conference on Recent Advances in Robotics, May 2012, http://www.eng.fiu.edu/mme/robotics/elib/FCRAR2012-Robotic-Tennis-Ball-Collector.pdf (accessed Jul. 13, 2015); pp. 1-6.
"Tennis Ball Boy," RNR Associates web site, http://wWw.rnrassociates.com/wordpress/category/awesome-products/page/23/ (accessed Jul. 13, 2015); pp. 1-2.
Harper, J., et al. "Autonomous Tennis Ball Collector," Cal Poly Pomona web site, http://www.cpp.edu/-honorscollege/documents/convocation/EGR/ECE_Harper.pdf (accessed Jul. 13, 2015).
"Bear Claw: Tennis Ball Collector," University of California at Berkeley web site, http://www.me.berkeley.edu/ME102B/Past_Proj/f09/1 %20BearClaw%20Tennis%20Ball%20Collector/index.php (accessed Jul. 13, 2015).
Collier, et al. "Autonomous Tennis Ball Collector," University of Waterloo web site, http://www.engineering.uwaterloo.ca/-madharn/files/ME481_Autonomous%20Ball%20Collector.pdf (accessed Jul. 13, 2015); pp. 1-30.
Wei, Foo Shi ,"Design and develop of an automated tennis ball collector and launcher robot for both able-bodied and wheelchair tennis players—ball recognition systems," Universiti Tunku Abdul Rahman, http://eprints.utar.edu.my/540/1/MH-2012-0804533-1.pdf (accessed Jul. 13, 2015); pp. 1-78.
Grubb, et al. "Tenni::>coop Design Proposal," Autonomou Tennis tjall Go1lect1on Robot version 1.1; vvvU t.;::>Et: 480 Senior Design; Nov. 28, 2011; West Virginia University web site, http://www.google.com/url?17 sa=t&rct=j&q:=&esrc=s&source=web&cd=48&cad=rja&uact=8&ved=OCGQQFjAHOChqFQoTCM-xoLar28YC F UeggAod Nu EFfw&url=http%3A %2F%2Fcsee .wvu.edu%2F seniordesign%2FFall2011-480-Group 15%2Fdocs%2F480%2520Design%2520Proposal%2520Web.docx&ei=s2CIVY-.
"Product Engineering and Realization Laboratory," Purdue University web site, https://engineering.purdue.edu/PEARUsmash (accessed Jul. 14, 2015).
Temples, Marco "Supplementary European Search Report—European Patent Application No. 16766199.2" European Patent Office; pp. 1-7 dated Aug. 28, 2018.

\* cited by examiner

DUAL FUNCTIONAL ROBOT AND STORAGE BIN

CROSS-REFERENCE TO RELATED APPLICATIONS

This application is a continuation under 35 U.S.C. 120 of U.S. patent application Ser. No. 14/985,020, filed 30 Dec. 2015. U.S. patent application Ser. No. 14/985,020 claims the benefit of U.S. Provisional Application No. 62/120,855, filed 25 Feb. 2015, and U.S. Provisional Application No. 62/210,461, filed 27 Aug. 2015. The contents of all of the foregoing applications are incorporated herein by reference in their entireties, although the prosecution histories of the foregoing are not incorporated by reference.

BACKGROUND

A. Field of the Disclosure

The present disclosure relates generally to robots, and more particularly to an autonomous robot for collecting rollable objects and a method for collecting rollable objects.

B. Background

The sport of tennis is a popular and growing activity that attracts millions of participants each year. To improve their skills, tennis players frequently engage in practice drills using a machine or another person. To save time and effort, players often have a large number of tennis balls so that the player may continue to practice without constantly retrieving tennis balls. Although additional balls improve the player's efficiency during practice, the player must later engage in the tedious task of collecting the tennis balls after the practice session.

Similar problems exist in other sports and activities using balls or other handheld objects.

Several devices have been offered to improve the process of collecting tennis balls. Early devices were hand operated and required the player to push the device around the tennis court to collect the balls. Although these devices lessened the burden on the player, the devices still required that the player participate in the collection of the balls.

Robotic collectors have been attempted, but none have been light enough and energy-efficient enough for widespread public acceptance. Although such devices allow the player to rest while the device collects the balls, the devices suffer from numerous defects. First, such devices do not provide a convenient method for players to use the balls after collection. Although such devices use various means to lift and store the ball at a height convenient for later use, these means require significant power to lift tennis balls and would therefore quickly deplete the energy source. As a result, the player must take additional steps after collection to make convenient use of the balls. Second, such devices are not energy efficient. Such devices deploy collection mechanisms that use significant energy to collect the balls, which requires either that the player frequently charge the device or that the system incorporate large, heavy energy sources. In addition, such devices do not necessarily use efficient algorithms for ball location, resulting in the device wasting energy by travelling in inefficient collection patterns.

Consequently, there is a long-felt need in the art for an efficient, light-weight, autonomous ball collection device that provides convenient access to balls after collection.

SUMMARY

The problems in the art described above are addressed by the robots and methods provided in this disclosure. Although the identified problems are described in the context of the collection of tennis balls, it should be recognized that similar problems apply generally to the collection of rollable objects and that the robots and methods taught herein are generally applicable to the collection of other rollable objects.

An autonomous robotic rollable object collector is provided. A general embodiment of the robot comprises: (a) a center of mass, a front end, a rear end, a midpoint, and an axis of rotation, wherein the center of mass is between the front end and the midpoint, and the axis of rotation is the axis about which the robot rotates when tilted between the upright position and the horizontal position; (b) a first load-bearing wheel supporting the robot forward of the midpoint, having a radius (r), positioned so that the robot in the horizontal position may be rotated at least 45° along the axis of rotation without the front end coming into contact with the ground; (c) a mobile load-bearing support structure supporting the robot rearward of the midpoint while in the horizontal position; (d) a drive motor providing rotation to a drive wheel; (e) an energy source providing energy to the drive motor; (f) a rotating collector proximate to the front end; (g) a holding basket having a first basket position, in which said holding basket is positioned to receive the rollable object from the rotating collector while in the horizontal position and in the first basket position; (h) a controller connected to provide control signals to the drive motor; and (i) a sensor connected to provide data to the controller. In this general embodiment, the robot is capable of a upright position and a horizontal position. The robot autonomously collects rollable objects when in the stable horizontal position. After the robot collects the objects, the user can easily tilt the robot into the stable upright position, which elevates the position of the collected balls to allow convenient access.

Another general embodiment of the robot comprises: (a) means for propelling the robot; (b) means for controlling propulsion of the robot connected to provide commands to the means for propelling; (c) means for locating the rollable object connected to provide data to the means for controlling propulsion; (d) means for collecting the rollable object; (e) means for storing the rollable object positioned to accept the rollable object from the means for collecting; (f) means for supporting the robot and allowing the robot to move across a surface in a low-friction manner; and (g) means for stably reorienting the robot from the horizontal position into the upright position.

A method for collecting a plurality of rollable objects is also provided. The method comprises: (a) providing either of the robots described above; (b) geofencing a collection area to establish boundaries of the collection area; (c) instructing the controller to scan the collection area with the sensor; (d) querying the sensor as to whether one of the plurality of rollable objects has been located; (e) determining whether said one of the plurality of rollable objects is located within the boundaries of the collection area; and (f) if said one of the plurality of rollable objects is located within the boundaries of the collection area, instructing the controller to direct the robot to said one of the plurality of rollable objects and collect said one of the plurality of rollable objects, and if not instructing the controller to continue scanning the collection area with the sensor. According to this method, the robot efficiently collects the plurality of rollable objects.

By only collecting the rollable objects in the boundaries of the collection area, the robot conserves time and energy in the collection process.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

A. Definitions

Figure 1:
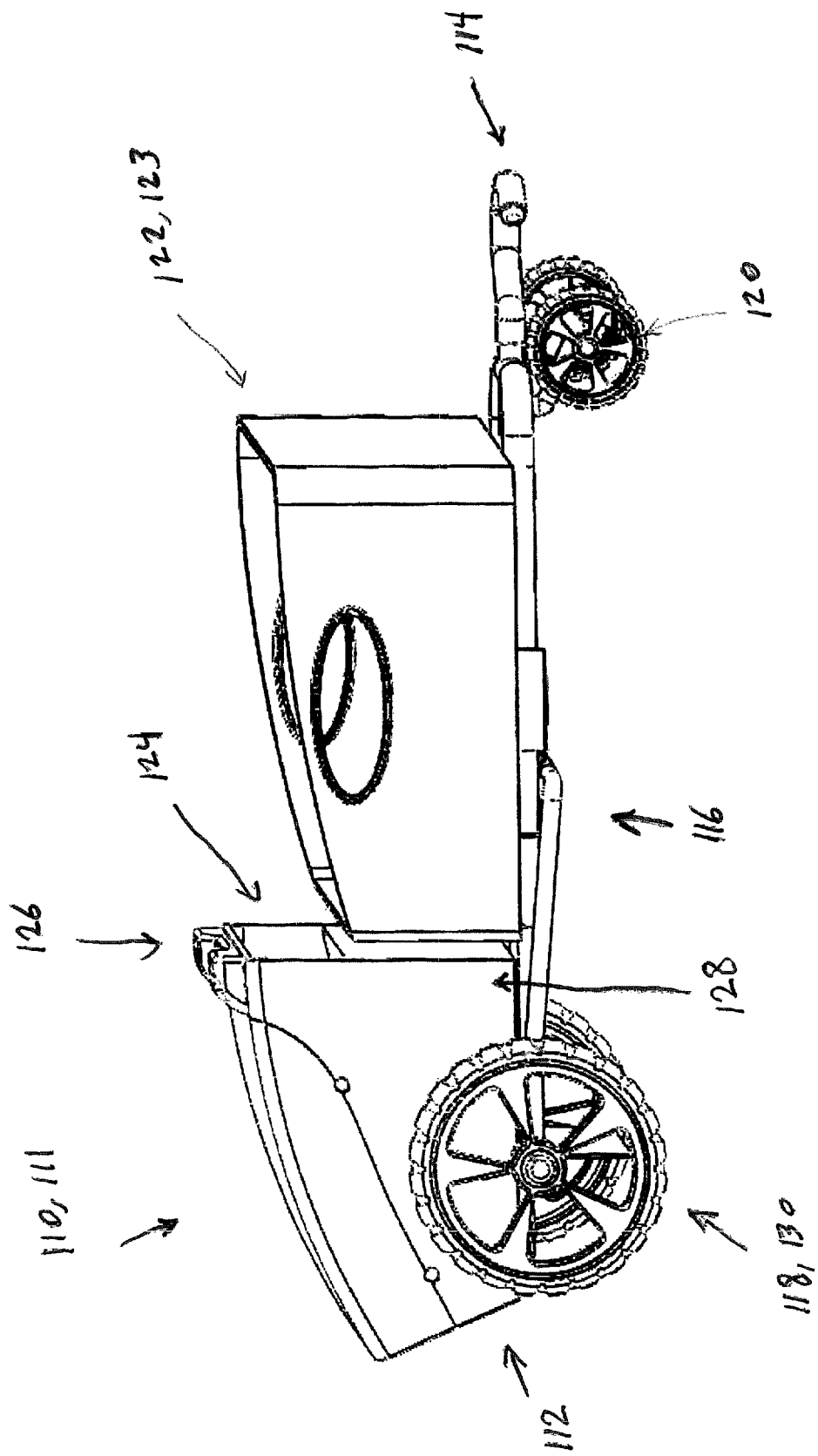
FIG. 1: A side view of an envisioned embodiment of the robot in the horizontal position.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well (i.e., "at least one"), unless the context clearly indicates otherwise.

Spatially relative terms, such as "under", "below", "lower", "over", "upper" and the like, may be used herein for ease of description to describe one element or feature's relationship to another when the robot is positioned in the horizontal position (i.e., right side up).

The terms is "first" and "second" are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The terms "about" or "approximately" mean within a range of reasonable error around a central value. Such reasonable error may for example stem from the precision of an instrument or method used to measure the value. The error could also stem from the precision of a method of making a component of a device. Specific examples of such limits of reasonable error are 20%, 10%, 5%, 2.5%, and 1%. Unless specified otherwise, all numerical values in the specification are approximate. Unless specified otherwise, all numerical values in the claims are exact.

B. Robot

An autonomous robotic rollable object collector 110 is provided. The robot 110 is capable of a horizontal position 111 and an upright position 211. In the horizontal position 111, the robot 110 is capable of autonomously collecting a rollable object. The rollable object may be a tennis ball, a golf ball, or any other spherically shaped object. Alternatively, the rollable object may be of a different shape having a circular, elliptical, or oval cross-section; for instance a cylindrical shape, conical shape, etc., so long as it is capable of rolling on a surface.

A general embodiment of the robot 110 comprises: (a) a center of mass 128, a front end 112, a rear end 114, a midpoint 116, and an axis of rotation, wherein the center of mass 128 is between the front end 112 and the midpoint 116, and the axis of rotation is the axis about which the robot 110 rotates when tilted between the upright position 211 and the horizontal position 111; (b) a first load-bearing wheel 118 supporting the robot forward of the midpoint 116, having a radius (r), positioned so that the robot 110 in the horizontal position may be rotated at least 45° along the axis of rotation without the front end 112 coming into contact with the ground; (c) a mobile load-bearing support structure 120 supporting the robot 110 rearward of the midpoint 116 while in the horizontal position 111; (d) a drive motor 310 providing rotation to a drive wheel 130; (e) an energy source 312 providing energy to the drive motor 310; (f) a rotating collector 314 proximate to the front end 112; (g) a holding basket 122 having a first basket position 123, in which said holding basket is positioned to receive the rollable object from the rotating collector 314 while in the horizontal position 111 and in the first basket position 123; (h) a controller 318 connected to provide control signals to the drive motor 310; and (i) a sensor 126 connected to provide data to the controller 318.

Figure 2:
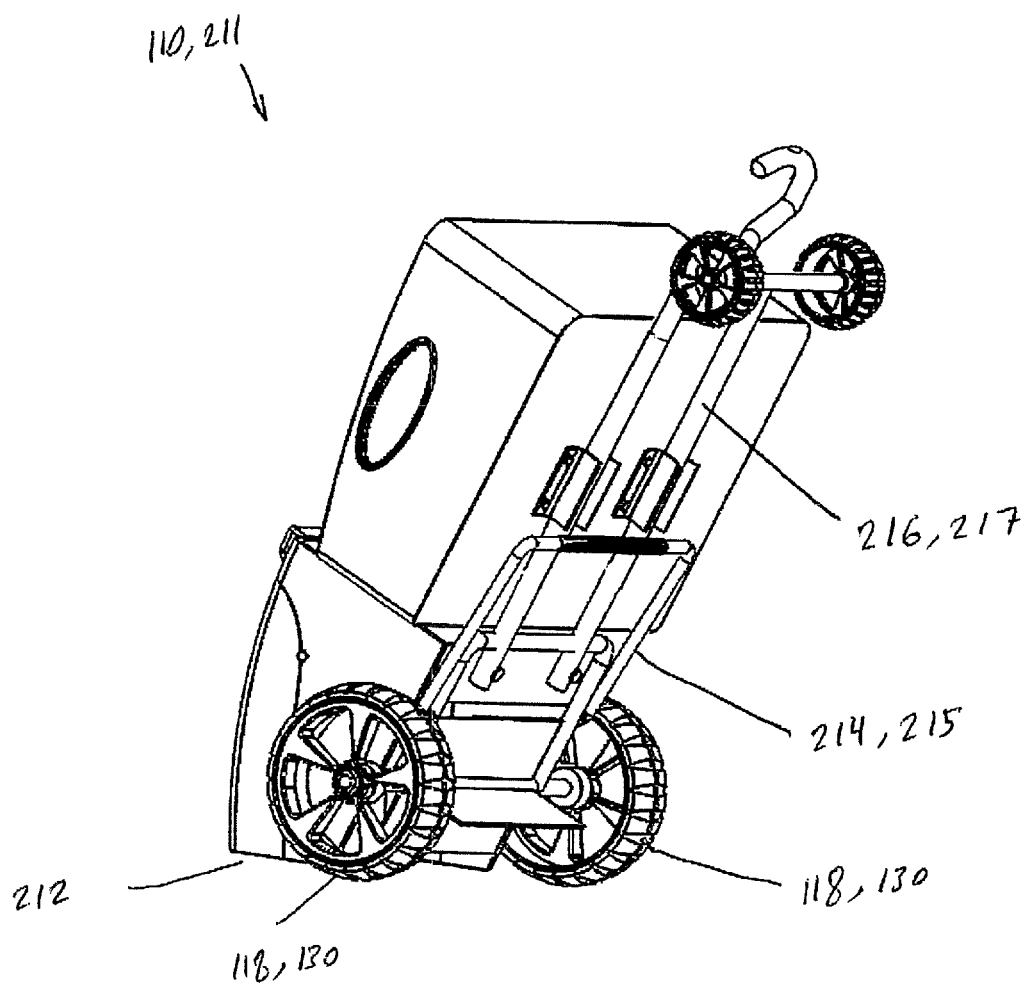
FIG. 2: A perspective view of the embodiment of the robot shown in FIG. 1 in the upright position.

Referring now to the drawings, FIG. 1 provides a side view of one embodiment (referred to herein as the "envisioned embodiment") of the robot 110 in the horizontal position 111 and FIG. 2 provides a perspective view of the envisioned embodiment of the robot 110 in the upright position 211. As shown in FIG. 1, the robot generally has a front end 112, a rear end 114, and a midpoint 116. Two first load-bearing wheels 118 are attached to the robot 110 forward of the midpoint 116, and a pair of mobile load-bearing support structures 120 are attached rearward of the midpoint 116. In the envisioned embodiment, the mobile load-bearing support structures 120 comprise a pair of second load-bearing wheels. But in alternative embodiments, the mobile load-bearing support structure may comprise one or more other structures, such as a skid, a caster, or a roller. The first load-bearing wheel 118 and the second load-bearing wheel 120 may be constructed of any suitable material. Although the first load-bearing wheel 118 is shown having a radius substantially greater than the second load-bearing wheel 120, it is understood that the wheels 118, 120 may be of any suitable radius. In general, however, it is preferred that the front wheel 118 have a larger radius to facilitate the transition of the robot 110 from the horizontal position 111 to the upright position 211. Although wheels are provided in the envisioned embodiment, the robot may use other means to support the robot and allow it to move across a surface in a low-friction manner. For instance, a track drive system may be used. As another example, rollers may be used, particularly for a load-bearing wheel that is not a drive wheel.

As illustrated in the figures, in some embodiments of the robot 110 there are a plurality of first load-bearing wheels 118 and/or a plurality of mobile load-bearing support structures 120. Specific embodiments of the robot comprise two first load-bearing wheels, two mobile load-bearing support structures, or both. In embodiments of the robot with more than one first load-bearing wheel 118, the first load-bearing wheels may be co-axial. The load-bearing wheels may also be drive wheels 130. Embodiments of the robot 110 in which the first (front) load bearing wheel 118 is a drive wheel have the advantage of facilitating the location of the drive motor 310 in the front 112 of the robot, which creates a lower center of mass 128 when the robot is in the upright position 211 due to the generally high mass of drive motors 310. It also allows the robot 110 to be steered by simply providing differing amounts of power to the drive wheels 130.

The drive wheel 130 may be the same as any of the load-bearing wheels 118, 120. There may of course be multiple drive wheels 130. A specific embodiment of the robot comprises two first load-bearing wheels 118 which are also the two drive wheels 130. Alternatively, where the mobile load-bearing support structure 120 is a second load-bearing wheel 120, the second load-bearing wheel may be the drive wheel. Of course, the drive wheel may also be a non-load bearing wheel, so long as the robot has load bearing wheels and mobile load-bearing support structures in sufficient number and strength to support it.

The envisioned embodiment of the robot 110 in FIG. 1 also includes an optional housing unit 124 and a holding basket 122. The housing unit 124 contains a drive motor, an energy source, a rotating ball collector, and a controller. The housing unit 124 may be constructed of any suitable material, such as a plastic like high density polyethylene or a metal alloy. In alternative embodiments, the robot 110 may not include a housing unit 124, or the drive motor, the energy source, the rotating collector, or the controller may be located outside of the housing unit. A sensor 126 is attached to the top of the housing unit 124 and is capable of detecting the rollable object. The sensor 126 may alternatively be attached at any location on the robot 110 that is suitable for detecting the rollable object, and in some embodiments, the robot may include more than one sensor 126 for detecting the rollable object.

The holding basket 122 contains the rollable object collected by the robot 110, and FIG. 1 shows the holding basket 122 in a first basket position 123. In the first basket position 123, the holding basket 122 is positioned to receive the rollable object from the rotating collector. The holding basket 122 may be any suitable shape, such as a rectangular prism or a cylindrical prism, and constructed of any suitable material, such as a plastic or a metal alloy. Alternatively, the robot may use other means for storing the rollable object, such as a sack. Some embodiments of the basket are reversibly removable from the robot, to allow a user to carry the loaded basket to another location to be emptied, and then returned to the robot.

The robot 110 has a center of mass 128. Although components like the drive motor and the energy source may be attached in various locations on the robot 110, the components must be attached such that the center of mass 128 is located at some point between the front end 112 and the midpoint 116. By maintaining a center of mass 128 between these locations, the robot 110 may be more easily transitioned between the horizontal position 111 and the upright position 211. Furthermore, the robot 110 is more stable in the upright position 211 due to a lower center of mass 128.

The envisioned embodiment is shown in the upright position 211 in FIG. 2. The upright position 211 is an orientation of the robot which has been tilted at least 45 degrees upward from the horizontal position 111. The robot 110 has an axis of rotation, which is defined as the line about which the robot 110 rotates when it is tilted between the horizontal position 111 and the upright position 211. In a specific embodiment of the robot, the axis of rotation of the robot is coaxial with the load bearing wheel's axis of rotation. The upright position 211 allows more convenient access to the rollable objects because the height of the holding basket 122 is elevated. When the envisioned embodiment of the robot 110 is in the upright position 211 as shown in FIG. 2, it is supported by the first load-bearing wheel 118. The robot may be optionally supported by at least one additional load-bearing support structure 212, 214. The envisioned embodiment of the robot 110 shows two types of load-bearing support structures 212, 214. The support structure 212 is proximate to the front end 112 and positioned to contact the ground when the robot 110 is in the upright position 211. For instance, as shown in FIG. 2, the housing unit 124 may include a surface 212 that contacts the ground when the robot 110 is in the upright position 211. Alternatively or additionally, the robot 110 may include a retractable strut 214. The retractable strut 214 has a retracted strut position 215 and an extended strut position 515. The retractable strut 214 is of sufficient length to contact the ground when the robot 110 is in the upright position 211 and the retractable strut 214 is in the extended strut position 515. As envisioned in the embodiment of FIG. 2, the retractable strut 214 is a folding leg, but it should be understood by one skilled in the art that other types of retractable struts may be used. For instance, a retractable strut may comprise a kickstand, similar to a kickstand typically found on a bicycle. A kickstand has the advantage of allowing a user to deploy the stand using only the user's feet, so that the user does not need to bend down to deploy it. Regardless of its precise structure, the load-bearing support structure 212, 214 helps to stabilize the robot 110 in the upright position by providing an additional point of contact with the ground.

As shown in FIG. 2, some embodiments of the robot include an optional chassis 216. The chassis 216 may be an extendable chassis, having an extended chassis position 517 and a retracted chassis position 217. The chassis 216 may be constructed of any suitable material, such as a metal or a plastic, and may use any method of extension that is known by those skilled in the art. For instance, the chassis 216 may comprise a telescoping member that allows the chassis 216 to extend to the extended chassis position 517. Alternatively, the robot 110 may not include a chassis 216, but may use other known means to reversibly extend the height of the robot 110 when the robot is in the upright position 211. For instance, the robot 110 may have an extendable body.

Figure 3:
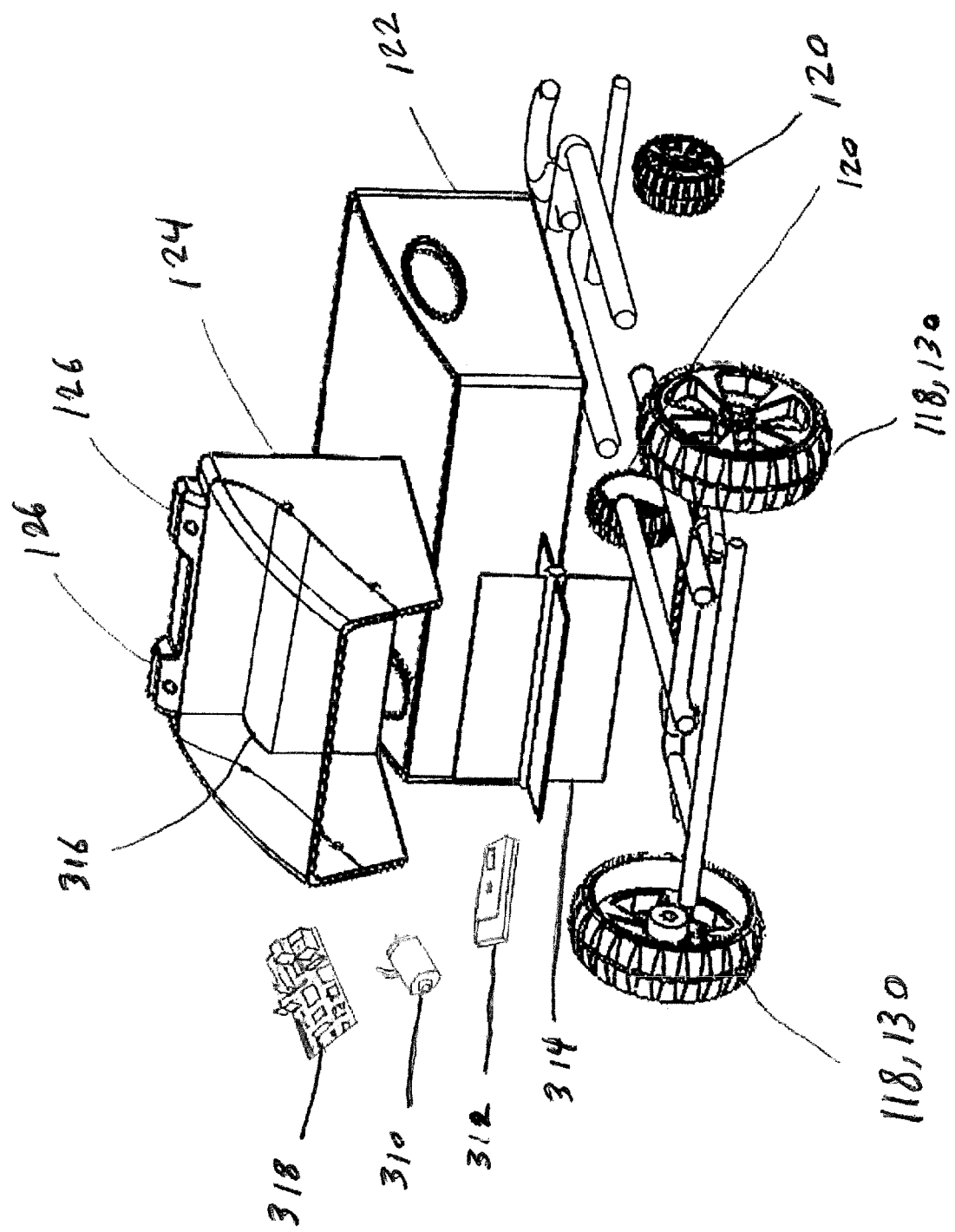
FIG. 3: An exploded view of the embodiment of the robot shown in FIG. 1.

FIG. 3 provides an exploded view of the envisioned embodiment of the robot 110. The robot 110 generally has at least one first load-bearing wheel 118 and at least one mobile load-bearing support structure 120. As discussed with respect to FIG. 1, the housing unit 124 contains the drive motor 310, the energy source 312, the rotating collector 314, and the controller 318. The drive motor 310 provides rotation to the drive wheel 130. The drive motor 310 may use any method or combination of methods to provide rotation that is known in the art, such as by connecting directly to the wheel, connecting through gears to the wheel, or connecting by a belt to the wheel. In the envisioned embodiment, the drive motor 310 comprises an electrical motor. In alternative embodiments, the drive motor 310 may comprise a combustion engine, a pneumatic motor, a hydraulic motor, or any other suitable means for propelling a robot that is known in the art.

The energy source 312 is connected to provide energy to the drive motor 310. The energy source 312 may comprise any suitable source of energy. For instance, a rechargeable battery, such as a lithium-ion battery, may be used for an electrical motor. Alternatively, a disposable battery, such as one or more lithium batteries, may be used. The energy source 312 may also comprise a fuel cell. In yet other embodiments, the energy source 312 may comprise a source of alternating current. For instance, the energy source 312 may be a conventional power cord connected to a power outlet that is connected to an electrical grid. The energy source 312 may also comprise a source that wirelessly provides energy, such as through the use of an electromagnetic field. In embodiments using a combustion engine, the energy source 312 may comprise gasoline, diesel, propane, or any other suitable fuel for combustion. And in embodiments with a compressed air motor, the energy source 312 may comprise any suitable compressed gas that may be stored in a container, such as a tank.

The rotating collector 314 is attached proximate to the front end of the robot 110 and provides means for collecting the rollable objects. In the embodiment shown in FIG. 3, the rotating collector 314 comprises a plurality of blades connected to a shaft, and it may be constructed of any suitable material, such as a plastic or a metal alloy. Various structures may provide rotation to the rotating collector 314. In some embodiments, the robot may include a second drive motor to provide rotation to the rotating collector 314. The second drive motor be any known suitable motor, including for example an electric motor, a combustion engine, a pneumatic motor, or a hydraulic motor. The second motor may be connected to receive energy from a separate energy source, such as a battery or a fuel cell, or it may be connected to the energy source 312 that provides energy to the drive motor 310. In other embodiments, the drive motor 310 may provide rotation to the rotating collector 314. Alternatively, the rotating collector may be rotated by the movement of the robot. For instance, the rotating collector may be connected to a wheel that turns when the robot moves forward. To receive the rotational force, the rotating collector 314 may be connected using any suitable structure, such as a drive belt or a plurality of gears. As shown in FIG. 3, when the shaft rotates, any blade near the front will rotate towards the rear by traveling downward, and any blade near the rear will rotate towards the front by traveling upward. In some embodiments, the robot 110 includes a ramp 316, which may be optionally located in the housing unit 124. The ramp 316 is positioned to receive the rollable object from the rotating collector 314 and guide the rollable object to the holding basket 122 in the first basket position 123. Thus, in the envisioned embodiment, when the robot 110 approaches the rollable object, the rotating collector 316 will propel the rollable object toward the rear end 114 and up the ramp 316. The ramp 316 will guide the rollable object into the holding basket 122, where the rollable object is then stored. The combination of the blade-and-shaft collector and ramp provides a low energy means to collect and hold the objects, as the objects are elevated only a short distance before falling off the end of the ramp. In some embodiments of the robot the rotation of the collector is selectively activated when the robot is in close proximity to an object to be collected, which also serves to conserve power. In other embodiments, the rotating collector may be of different structures. For instance, the rotating collector 314 may comprise a roller with a high-friction surface, such as a rubber surface. In such embodiments, the rotating collector rotates such that, when the high-friction surface of the roller contacts the rollable object, the rollable object is propelled toward the rear end 114 and into the holding basket 122. The roller may be as simple as a cylinder, or may have a generally cylindrical shape. In other embodiments, the rotating collector 314 may comprise a rotating belt assembly to lift the rollable object into the holding basket 122. The rotating collector 314 may also comprise a shaft that is perpendicular to the ground with a plurality of blades connected thereto, where the shaft and the blades rotate to propel the rollable object into the holding basket 122. As will be recognized by one skilled in the art, the robot may also employ other means for collecting the rollable object, such as a suction system.

The envisioned embodiment of the robot 110 has a controller 318 to provide means for controlling the propulsion of the robot 110. The controller 318 may comprise a microcontroller, which typically contains a processor core, memory, and programmable input/output peripherals. Alternatively, the controller 318 may comprise a microprocessor, and the microprocessor may optionally include peripheral devices such as a memory or a transceiver. The controller 318 connects to the sensor 126 to receive data from the sensor 126 and connects to the drive motor 310 to provide control signals to the drive motor 310. For instance, when the sensor 126 provides data that locates a rollable object, the controller 318 provides control signals to the drive motor 310 to direct the robot 110 to the rollable object. The controller 318 may alternatively be located outside of the housing unit 124, and it may connect to the sensor 126 and the drive motor 310 using any acceptable means, such as a wired connection or a wireless connection. The controller 318 has access to logic for processing the sensor data to locate the rollable objects. In the envisioned embodiment, the controller 318 contains this logic, which may be programmed logic to be executed by the processor or hardwired logic. But the logic may be optionally stored and executed on other devices. For instance, in some embodiments, the controller 318 may comprise a hardware unit that receives data from the sensor 126; transmits the data to a remote processing unit, such as a remote computer; and receives commands from the remote processing unit. In such an embodiment, the remote processing unit would receive the data transmitted by the controller 318, apply the logic to the data, and provide command signals to the controller 318.

Referring again to FIG. 3, the envisioned embodiment of the robot 110 has two sensors 126. More specifically, the sensors 126 are visual sensors that are positioned to provide overlapping fields of view. The visual sensor may comprise a photodetector, which may be similar to the photodetector often in cell phone cameras or web cameras. The visual sensor may also comprise an infra-red sensor. In alternative embodiments, the sensor 126 may not be a visual sensor. Instead, the sensor 126 may comprise a sonar system, which may emit sound to locate the rollable objects. Other embodiments may have a sensor 126 that detects radio frequency identifications (RFIDs). In such an embodiment, the rollable objects may each contain an RFID tag that can be detected by the sensor 126. The sensors 126 in the envisioned embodiment detect rollable objects based on the color of the rollable object and determines the distance of the rollable object by comparing its known size to its perceived size. The sensors 126 are connected to the controller 318 to provide data to the controller 318, such as the location of the rollable object. The sensors 126 may be connected using any suitable type of connection, such as a wired connection or a wireless connection. However, it would be recognized by one skilled in the art that the sensor 126 may employ other methods to detect and determine the location of the rollable object, such as by comparing difference in the perceived positions of the object in the two overlapping fields of view. The use of stereo images to determine the location of the object has the advantage of being capable of locating an object of unknown size (i.e., it does not depend on the perceived size of the object to calculate distance). Alternatively, a robot 110 may include only one sensor, more than two sensors 126, or other means to locate the rollable objects.

Figure 4:
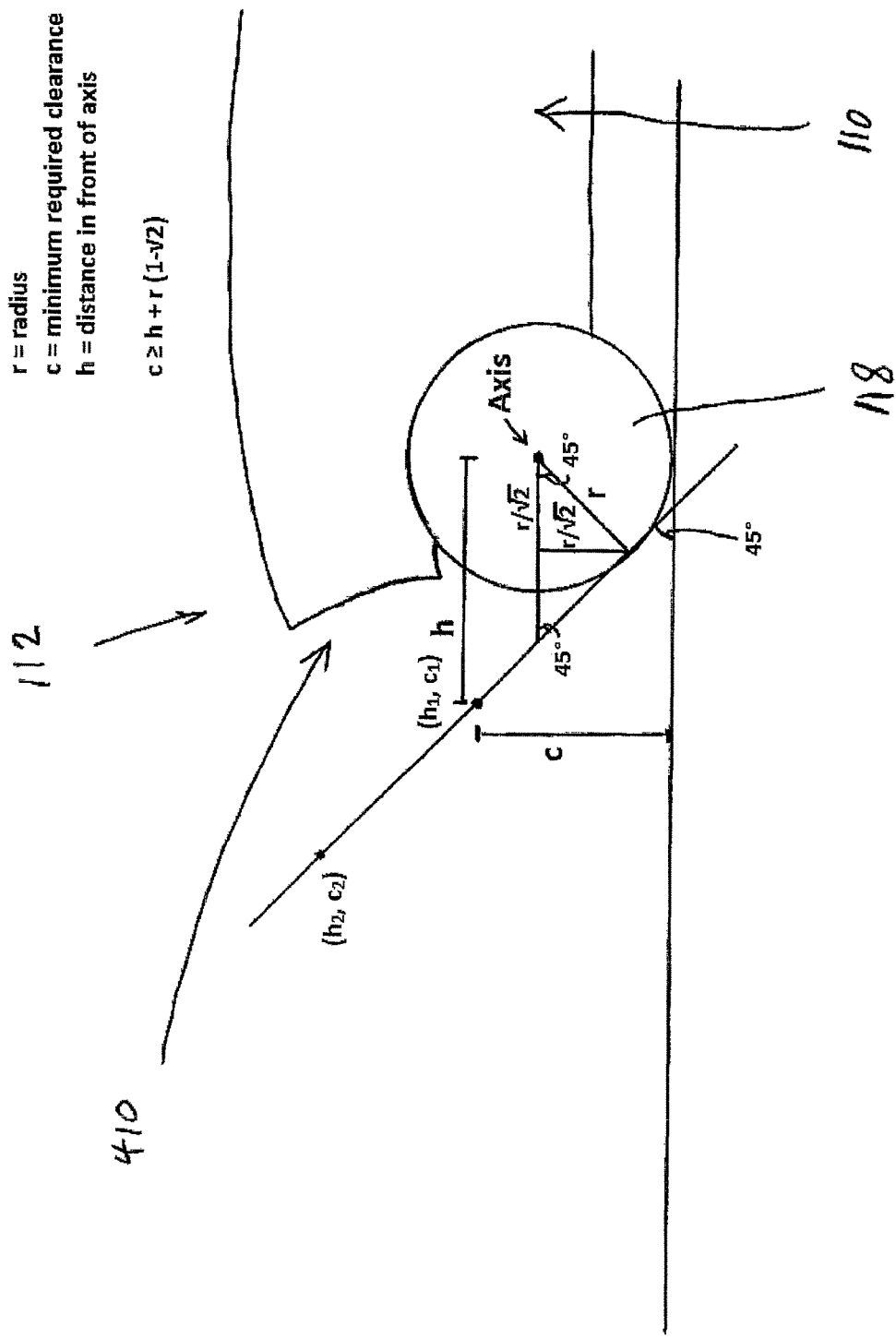
FIG. 4: A detailed view of the front end and the first load-bearing wheel of the embodiment of the robot shown in FIG. 1.

FIG. 4 provides a detailed view of the front end 112 and the first load-bearing wheel 118. The front end 112 has a bottom surface 410 when the robot is in the horizontal position 111. The first load-bearing wheel 118 has a radius (r) and an axis, which may correspond to the robot's axis of rotation where, as in this embodiment, the first load-bearing wheels are co-axial. The first load-bearing wheel 118 is positioned so that the robot 110 may be rotated at least 45° about the axis of rotation from the horizontal position without the front end 112 coming into contact with the ground. The bottom surface 410 of the front end 112 therefore must have sufficient clearance while in the horizontal position to allow the robot 110 to be rotated on the load-bearing wheel 118 between its two positions. The clearance distance is measured as the distance between the bottom surface 410 and the ground when the robot is in the horizontal position 111. To allow the robot 110 to be rotated at least 45°, the bottom surface 410 must have a clearance distance (C) at every distance (h) in front of the axis of rotation, such that $$C \geq h + r*[1-sqrt(2)] \quad \text{Formula 1}$$

In embodiments in which the clearance distance (C) is not consistent across the bottom surface 410 at a given distance (h) in front of the axis, formula 1 above would be applied to the smallest C (least clearance) at the given h. This formula is graphically depicted as a line in FIG. 4. By requiring that no point on the robot 110 extend beyond the line, it is ensured that the robot may be tilted at least 45 degrees along its first load-bearing wheel 118. In alternative embodiments, the robot 110 may use other means, such as a rounded surface proximate to the front end 112, to allow for the stable reorientation of the robot from the horizontal position to the upright position. Alternatively, the load-bearing wheel 118 could be positioned in front of the front end 112. It is to be understood that the "bottom surface" need not be one continuous surface, but may be a plurality of surfaces or structures that define the lowermost structures of the front end.

Figure 5:
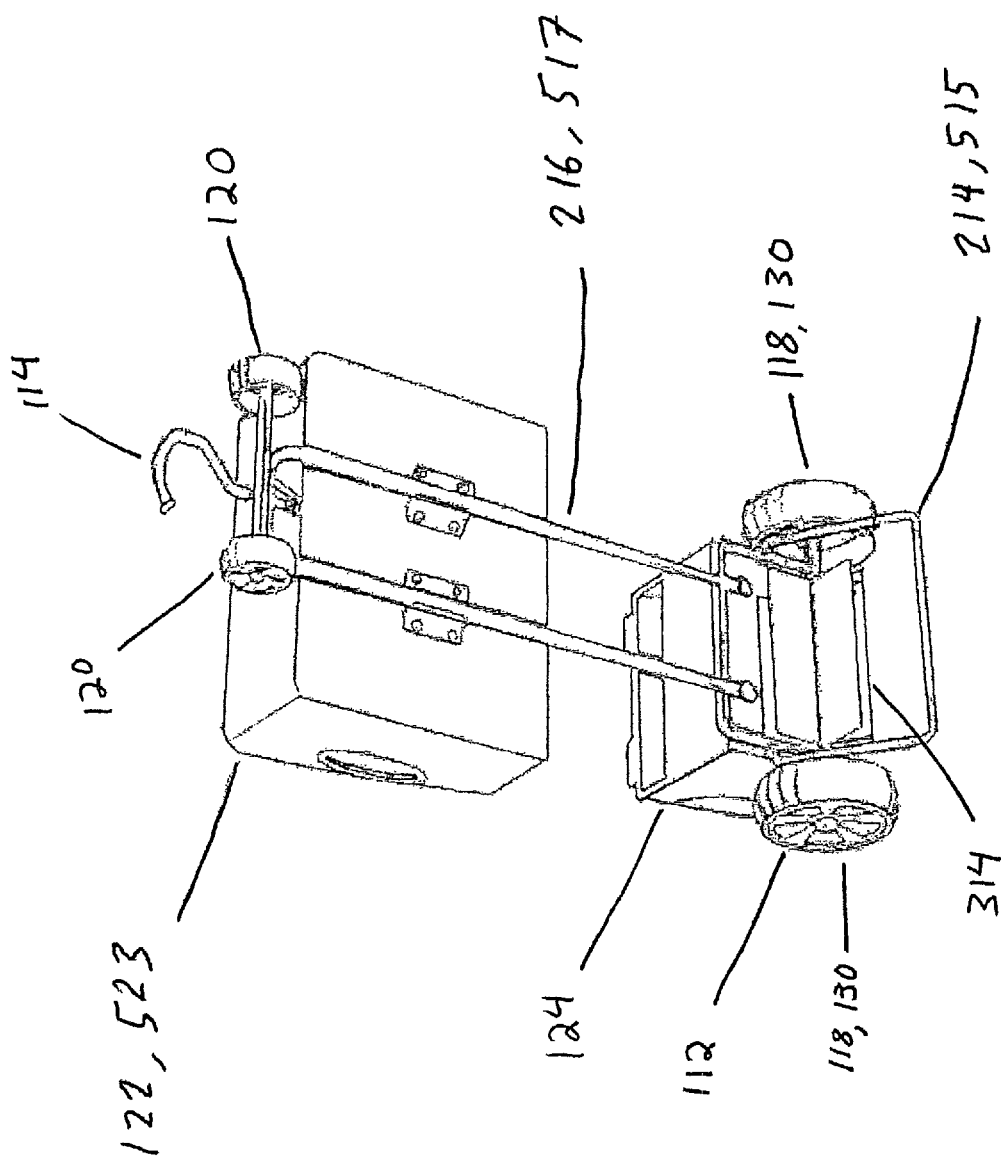
FIG. 5: A perspective view of the embodiment of the robot shown in FIG. 1 in the upright position with the chassis in the extended chassis position.

FIG. 5 provides a perspective view of the envisioned embodiment of the robot 110 in the stable upright position 211 with the chassis 216 in the extended chassis position 517 and the retractable strut 214 in the extended strut position 515. Furthermore, FIG. 5 shows the holding basket 122 in a second basket position 523, which is higher than the first basket position 123 when the robot is in the upright position 211. The holding basket 122 may be elevated using various means. For instance, if the robot 110 includes a chassis 216 with a telescoping member, the holding basket 122 may be attached to the telescoping member such that the holding basket 122 moves with the telescoping member when the chassis 216 is extended to the extended chassis position 517. Alternatively, the holding basket 122 may be movably connected to the extendable chassis 216. For instance, the basket may be movably attached to the chassis using plastic clips or removable clamps. In such an embodiment, after the extendable chassis 216 is in the extended chassis position 517, the holding basket 122 may be moved such that the holding basket 122 is connected closer to the rear end 114. In yet another embodiment, the chassis 216 is not extendable but runs from approximately the front end 112 to approximately the rear end 114. The holding basket 122 may be slidably attached to the chassis 216, which allows the holding basket to be slid from the first basket position 123 to the second basket position 523 proximate to the rear end 114. The slidable attachment may comprise, for example, a sleeve which fits around the chassis 216 and may be slid along the chassis 216, the holding basket 122 being connected to the sleeve. As one skilled in the art will recognize, other known means may be used to extend the height of the robot 110 and to elevate the holding basket 122 when in the upright position 211.

In some embodiments, the holding basket 122 is at least about 80 cm from the ground when the robot 110 is in the upright position 211 and the holding basket 122 is in the second basket position 517. In further embodiments, the holding basket 122 is at least about 100 cm from the ground when the robot 110 is in the upright position 211 and the holding basket 122 is in the second basket position 517. The distance from the holding basket 122 to the ground is measured from the ball supporting surface of the holding basket 122 when the robot 110 is in the upright position 211. At this height, the robot 110 provides an adult with convenient access to the rollable objects in the holding basket 122. This convenience is provided because the height of at least about 80 cm approximately corresponds with the hand level of most adults when standing. For instance, a tennis player would be able to retrieve tennis balls from the holding basket 122 without bending over once the holding basket 122 is in the second basket position 517. This provides a means to raise the collected objects within reach of a standing user without consuming any power provided by the energy source.

Another general embodiment of the robot comprises: (a) means for propelling the robot; (b) means for controlling propulsion of the robot connected to provide commands to the means for propelling; (c) means for locating the rollable object connected to provide data to the means for controlling propulsion; (d) means for collecting the rollable object; (e) means for storing the rollable object positioned to accept the rollable object from the means for collecting; (f) means for supporting the robot and allowing the robot to move across a surface in a low-friction manner; and (g) means for stably reorienting the robot from the horizontal position into the upright position.

These means may be the structures described above, or they may be other structures. For instance, the means for propelling the robot may be any version of the drive motor 310 and the drive wheel 130 described above. The means for propelling may also be any equivalent to these structures, such as a track system connected to a drive system to rotate the tracks, or a plurality of legs connected to actuators to provide movement to the legs. These means may be connected to any suitable energy source described above, such as a battery, fuel cell, or combustible fuel.

The means for controlling the propulsion of the robot may be any version of the controller 318 described above. The controller 318 is connected to provide commands to the means for propelling. As described above, the means for controlling the robot may comprise a remote control source and a receiver, where the remote control source determines the propulsion of the robot and provides command signals to the receiver, which transmits those signals to the means for propelling.

The means for locating the rollable object may be any version of the sensor 126 described above, such as a visual sensor. The sensor provides data, such as visual images, to the means for controlling. In some embodiments of the robot, the rollable objects may contain trackers which transmit their locations to a receiver on the robot. The receiver may then provide this data to the means for controlling propulsion.

The means for collecting the rollable object may comprise any version of the collector 314 described above. Some embodiments of the means for collecting are any version of the rotating collector 214 described above. Alternatively, the means for collecting may be a suction system that uses a pressure differential to collect the rollable object, a scoop that lifts the rollable objects, or a claw that grasps the rollable objects.

The means for storing the rollable object may be any version of the holding basket 122 described above. In other embodiments, the means for storing may be a sack, a rack, or a tube.

The means for supporting the robot and allowing the robot to move across a surface in a low friction manner may comprise a plurality of wheels 118, 120. For example, the means for supporting the robot and allowing the robot to move across a surface in a low friction manner may be any version of the first load-bearing wheel described above, the mobile load-bearing support structure described above, or a combination of both. Alternatively, the means may be a plurality of skids, a track system, a plurality of casters, a plurality of rollers, or a plurality of legs. In some embodiments, the means may comprise multiple structures. For instance, the means for supporting the robot and allowing the robot to move may comprise a plurality of wheels and a plurality of skids.

The means for stably reorienting the robot from the horizontal position to the upright position may be any version of the first load-bearing wheel 118 described above. The robot may use other means for stably reorienting the robot, such as a rounded surface proximate to the front end. The rounded surface may be part of the body of the robot, the housing unit, or another structure attached to the robot. In embodiments using a track system as a means for supporting the robot, the track system may provide a means for stably reorienting the robot.

The robot may optionally have means to reversibly extend the height of the robot when the robot is in the upright position. For instance, the means for reversibly extending the height of the robot may be any version of the extendable chassis 216 described above. In other embodiments, the means for reversibly extending may be an extendable body. Alternatively, a component of the robot, such as the means for storing, may be slidably attached such that the position of the means for storing may be raised when the robot is in the upright position, thereby extending the height of the robot.

The robot may also optionally have means to elevate the means for storing when the robot is in the upright position. For example, the means may be any version of the extendable chassis 216 with a telescoping member described above, where the means for storing is attached to the telescoping member such that the means for storing is raised when the telescoping member is extended. In other embodiments, the means for storing may be slidably or movably attached to the robot such that the means for storing may be slid or moved to a heightened position when the robot is in the upright position. Additionally, the means for elevating may include a structure, such as a gas spring, to elevate the means for storing.

C. Method for Collecting Rollable Objects

A method for collecting a plurality of rollable objects is also provided, in which the method uses any of the robots described above. The method comprises: (a) providing the robot as described above 610; (b) geofencing a collection area to establish boundaries of the collection area 612; (c) instructing the controller to scan the collection area with the sensor 614; (d) querying the sensor as to whether one of the plurality of rollable objects has been located 616; (e) determining whether said one of the plurality of rollable objects is located within the boundaries of the collection area 618; and (f) if said one of the plurality of rollable objects is located within the boundaries of the collection area, instructing the controller to direct the robot to said one of the plurality of rollable objects and collect said one of the plurality of rollable objects 620, and if not instructing the controller to continue scanning the collection area with the sensor 622.

Figure 6:
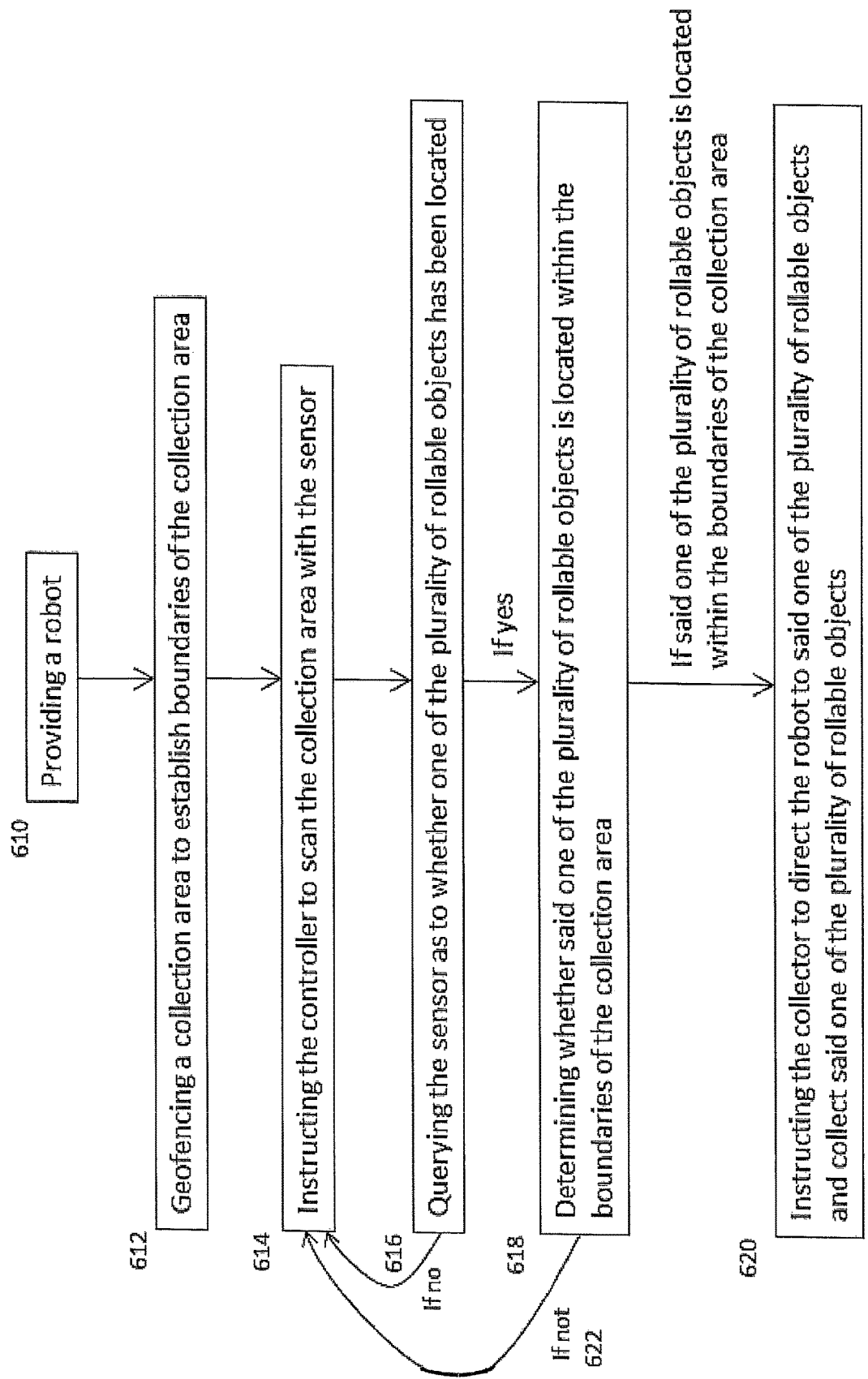
FIG. 6: A block diagram of an embodiment of the method for collecting rollable objects.

Referring to FIG. 6, the method uses one of the robots 110 described above. A collection area must be geofenced to establish the boundaries of the collection area 612. Geofencing refers to the process of defining the geographical boundaries of an area. The boundaries of the area may be defined with reference to a global positioning system (GPS), a radio frequency identification (RFID), or any other technique known in the art. For instance, a user may define the boundaries by using mapping software, such as Google Earth, or providing coordinates from a GPS. In other instances, the robot 110 may be programmed to define the boundaries of the collection area itself, such as by detecting known features that define the boundaries.

The controller 318 is then instructed to scan the collection area with the sensor 614 and the sensor 126 is queried to determine whether the sensor 126 has located one of the plurality of rollable objects 616. As previously discussed, the sensor 126 may use any number of techniques known by those skilled in the art to scan the collection area and locate the rollable objects.

If one of the plurality of rollable objects has been located, it is determined whether the rollable object is located within the boundaries of the collection area 618. Various methods may be used to determine whether the rollable object is located within the boundaries. As previously discussed, the sensor 126 may determine the distance of the rollable object from the robot 110. The sensor 126 may also determine the direction from the robot 110 to the rollable object. The sensor 126 may then calculate the location of the rollable object by using the location of the robot 110, the direction of the rollable object, and the distance of the rollable object.

If the rollable object is located within the boundaries of the collection area, the controller 318 is instructed to direct the robot 110 to the rollable object and to collect the rollable object 620. But if the rollable object is located outside of the boundaries of the collection area, the controller 318 is instructed to continue scanning the collection area with the sensor 622.

In some methods, the collection area may be divided into at least a first collection sub-area and a second collection sub-area, with the robot 110 being located in the first collection sub-area. For example, if the collection area is a half of a tennis court, the collection area may be divided such that the first collection sub-area is the backcourt of the half and the second collection sub-area is the frontcourt of the half. According to this method, when determining whether one of the plurality of rollable objects is located within the boundaries of the collection area, it is also determined whether the rollable object is located within the boundaries of the first collection sub-area. If the rollable object is located within the boundaries of the first collection sub-area, the controller 318 is instructed to direct the robot 110 to the rollable object and to collect the rollable object. But if the rollable object is not located within the boundaries of the first collection sub-area, the controller 318 is instructed to continue scanning the first collection sub-area with the sensor 126. Only after the first collection sub-area has been scanned, the controller is instructed to direct the robot to the second collection sub-area.

As one skilled in the art will recognize, the collection area may be alternatively divided into more than two collection sub-areas. By dividing the collection area into two or more sub-areas, the method improves the efficiency of the robot in the collection process. The robot is able to more quickly collect the rollable objects and expends less energy during the collection process.

D. Conclusions

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

I claim:

1. A robot for collecting tennis balls capable of an upright position and a horizontal position, and having a midpoint between front and rear, said robot comprising:
    (a) a front end;
    (b) a first axis of rotation about which the robot rotates when tilted between the upright position and the horizontal position;
    (c) a first load-bearing wheel capable of supporting the robot forward of the midpoint, having a radius (r), positioned so that the robot may be rotated at least 45° from the horizontal position along the first axis of rotation without the front end coming into contact with the ground and while the first load-bearing wheel remains in contact with the ground;
    (d) a mobile load-bearing support structure capable of supporting the robot while in the horizontal position;
    (e) a drive motor providing rotation to a drive wheel;
    (f) a rotating collector proximate to the front end and dimensioned to collect the tennis balls; and
    (g) a holding basket having a first basket position, in which said holding basket is positioned to receive the tennis balls from the rotating collector while in the horizontal position and in the first basket position.

2. The robot of claim 1, comprising a controller connected to provide control signals to the drive motor; and a sensor connected to provide data to the controller.

3. The robot of claim 1, wherein the front end has a bottom surface, and wherein the bottom surface has a clearance distance (C) at every distance (h) in front of the first axis of rotation, such that $C \geq h + r*[1-sqrt(2)]$ when in the robot is in the horizontal position.

4. The robot of claim 1 having a center of mass and a rear end, and wherein the center of mass is between the midpoint and the front end when the robot is not loaded.

5. The robot of claim 1, comprising an extendable chassis having an extended chassis position and a retracted chassis position.

6. The robot of claim 1, comprising an extendable chassis having an extended chassis position and a retracted chassis position, and wherein the extendable chassis comprises a telescoping member.

7. The robot of claim 1, comprising a ramp positioned to receive the tennis ball from the rotating collector and guide the tennis ball to the holding basket.

8. A robot for collecting a rollable object and capable of assuming an upright position and a horizontal position, the robot comprising:
 (a) means for propelling the robot;
 (b) means for controlling propulsion of the robot connected to provide commands to the means for propelling;
 (c) means for locating the rollable object connected to provide data to the means for controlling propulsion;
 (d) means for collecting the rollable object;
 (e) means for storing the rollable object positioned to accept the rollable object from the means for collecting;
 (f) means for supporting the robot and allowing the robot to move across a surface in a low-friction manner; and
 (g) means for reorienting the robot from the horizontal position into the upright position, wherein said means for reorienting the robot comprises a first load-bearing wheel having an axis of rotation about which the first load-bearing wheel rotates and about which the robot rotates at least 45° while the first load-bearing wheel is in contact with the ground when tilted between the upright position and the horizontal position.

9. The robot of claim 8, wherein the robot has a height when in the upright position, comprising means to reversibly extend the height of the robot when the robot is in the upright position.

10. The robot of claim 8, comprising means to elevate the means for storing when the robot is in the upright position.

11. The robot of claim 8, wherein the means for propelling the robot comprises a drive motor, a battery connected to supply power to the drive motor, and a drive wheel positioned to be driven by the drive motor.

12. The robot of claim 8, wherein the means for supporting the robot and allowing the robot to move across a surface in a low-friction manner comprises a plurality of wheels.

13. The robot of claim 8, wherein the means for controlling propulsion of the robot is an electronic controller.

14. The robot of claim 8, wherein the means for locating the rollable object comprises a visual sensor.

15. The robot of claim 8, wherein the means for collecting the rollable object is a rotating collector.

16. The robot of claim 8, wherein the means for storing the rollable object comprises a holding basket.

17. The robot of claim 8, wherein the means for reorienting the robot further comprises a second load-bearing wheel coaxial with the first load-bearing wheel.

18. The robot of claim 8, wherein the means for storing the rollable object can be positioned at an approximate hand level of a standing adult when the robot is in the upright position.

19. The robot of claim 8, wherein the means for storing the rollable object can be elevated to an approximate hand level of an adult when the robot is in the upright position while leaving the means for reorienting the robot in contact with the ground.

20. The robot of claim 8, comprising a ramp positioned to receive the rollable object from the means for collecting and guide the rollable object to the means for storing.

* * * * *